Jan. 5, 1937.  J. NEUFELD  2,066,999
TESTING OF GEAR HOBS AND THE LIKE
Filed May 22, 1935

Inventor:
Jakob Neufeld,
by Harry E. Dunham
His Attorney.

Patented Jan. 5, 1937

2,066,999

UNITED STATES PATENT OFFICE 2,066,999

TESTING OF GEAR HOBS AND THE LIKE

Jakob Neufeld, Berlin, Germany, assignor to General Electric Company, a corporation of New York Application May 22, 1935, Serial No. 22,908
In Germany May 30, 1934

3 Claims. (Cl. 88—24)

The present invention relates to the testing of gear hobs and the like, that is, of elements which have a plurality of projections or teeth arranged in a helix on a cylindrical surface. Gear hobs such as milling cutters are used for milling or cutting gears, worm wheels and the like. In order to attain the desired shape of the worm gear or like element to be cut, it is necessary that all of the teeth of the gear hob have exactly the same profile and are arranged in a definite relation to each other, usually in the form of a helix. To insure correct profiles of the different teeth, testing arrangements have been devised heretofore, permitting the comparison between each tooth of the gear hob with a standard, theoretically correct profile. These testing arrangements include a source of light for projecting individual teeth of a gear hob onto a screen, on which screen a standard or theoretically exact profile is drawn, preferably to an enlarged scale. The standard profile on the screen may be drawn in ink or it may be projected thereon by means including another source of light. Such testing arrangements permit the comparison between a standard profile and individual profiles of the gear hob teeth. However, such arrangements do not permit of testing or checking the relation between the different teeth on the gear hob to be tested, and hence they do not insure that the different teeth of a gear hob are disposed along a helix. In addition, such arrangements necessitate continuous adjustment during testing of a single gear hob or the like.

The object of my invention is to provide an improved arrangement for testing gear hobs and like elements having a plurality of helically arranged projections of teeth whereby the testing or checking may be carried out more completely in less time.

For a consideration of what I believe to be novel and my invention, attention is directed to the following description and the claims appended thereto in connection with the accompanying drawing which forms a part of my specification.

Figure 1:
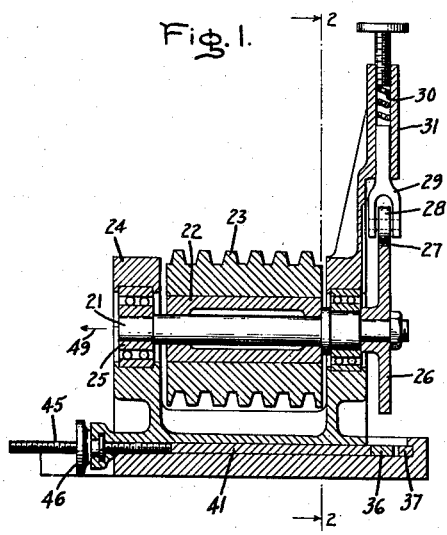
Figure 2:
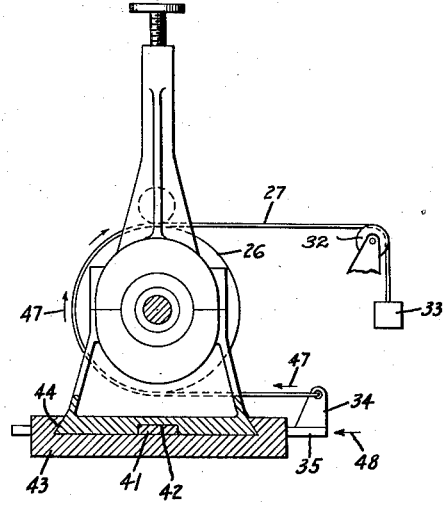
Figure 3:
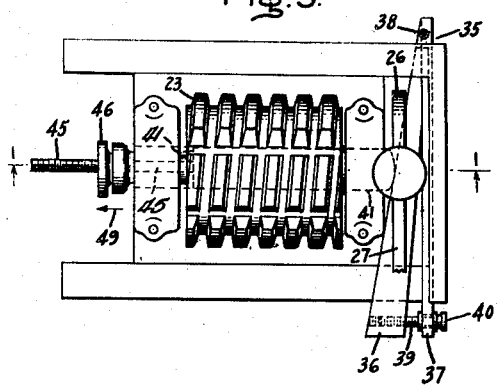

In the drawing, Fig. 1 represents a sectional view of a testing arrangement embodying my invention; Fig. 2 is a view along line 2—2 of Fig. 1; Fig. 3 is a top view of Fig. 1, Fig. 1 being a sectional view along the line 1—1 of Fig. 3; and Fig. 4 is an explanatory view.

Figure 4:
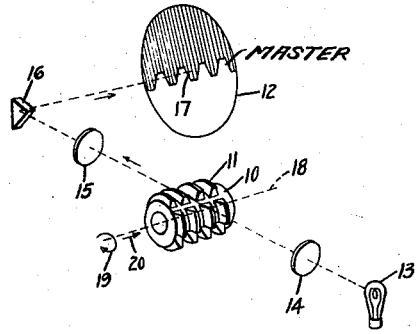

Referring first to the explanatory view of Fig. 4, a gear hob 10 is tested by projecting its teeth 11 onto a screen 12. The projecting means includes a source of light 13, lenses 14, 15 and a prism 16. A standard or theoretically exact profile 17 of the desired tooth shape is drawn on the screen 12. The projection of the teeth 11 must coincide with the drawing or the master 17 provided on the screen 12 if the gear hob is to be satisfactory. The gear hob has an axis of rotation 18. In accordance with my invention I provide means for rotating the gear hob, for instance, in the direction of the arrow 19 in Fig. 4 and means for simultaneously axially moving the gear hob, for instance, in the direction of the arrow 20 in Fig. 4. The arrangement is such that during rotational movement at a certain rate the gear hob is moved axially at another definite rate, depending on the rate of rotational movement and the pitch of the teeth, so that during continuous rotational movement of the gear hob the tooth projection on the screen will always coincide with the drawing thereon.

The testing arrangement shown by way of example in Figs. 1 to 3 comprises means including a rotatable shaft 21 and a sleeve 22 for rotatably supporting a gear hob 23 to be tested. Such gear hob 23 is secured to the sleeve 22 which in turn is secured to the shaft 21. The shaft 21 is rotatably supported on a bearing support or bracket 24 including anti-friction bearings 25. A wheel or disk 26 is secured to an overhung end portion of the shaft 21. This wheel forms an element of means for automatically moving the shaft in direction of its axis during rotational movement thereof. Said means also comprise a band 27 engaging the wheel 26 and biased against the circumference thereof by means of a roller 28 rotatably held on a yoke 29, which latter is biased towards the wheel 26 by an adjustable spring 30 disposed in a guide 31. One end of the band may be guided over a suitably supported roller 32 and secured to a weight 33. The other end of the band is linked to an upright 34 of a wedge 35. The wedge 35 includes two members 36 and 37 connected at one end by a pivot 38 and at the other end by means including a screw 39 and a nut 40. The screw is held on the member 36 and the nut is held on the member 37 so that adjustment of the screw causes the two members to be drawn towards or away from each other, thereby changing the wedge angle. The wedge angle may be indicated on a scale, not shown. The wedge member 36 engages a slidable bar 41 disposed in a recess 42 of the support. The support 24 is held on a fixed base or guide plate 43, in the present instance by a dovetail connection 44, permitting sliding movement of the bearing support along the axis of the shaft 21. The support 24 may be adjusted on the base plate 43 by means including a screw 45 connected to the bar 41 and a nut 46 suitably held on the bearing support 24 and engaging the screw 45.

During testing, the gear hob or like element to be tested is secured to the shaft 21. As will be noted, the support has a removable upper half or cover to permit easy assembly and disassembly of the gear hob to be tested. The band 27 which may be made of steel is then positioned. The tooth profile is projected onto a screen, preferably to an enlarged scale, on which screen a standard profile is drawn. Thereafter the gear hob is turned manually so that the different parts of the teeth coincide with the standard profile drawn on the screen. During rotation of the gear hob the steel band 27 is moved in the direction of the arrow 47. This causes movement of the wedge in the direction of the arrow 48. The wedge in turn moves the sliding element or bar 41 and consequently the entire support or bearing block 24, together with the gear hob in the direction of the arrow 49, in other words, in the direction of the axis of the bearing block and the gear hob.

The diameter of the wheel or disk 26 and the angle of the wedge 36, 37 are related to cause axial movement of the gear hob corresponding to the pitch of the teeth or the helix thereof. Thus, the gear hob may be rotated continuously without causing relative movement between the tooth projection and the standard tooth profile on the screen.

As stated above, adjustment of the screw and nut 39, 40, which may be in the form of a micrometer screw, permits testing of gear hobs and the like having teeth arranged at different pitches. Finally, adjustment of the support or bearing block by means of the screw 45 and the nut 46 permits displacement of the bearing block along its axis to such an extent that the projection of each tooth of the gear hob to be tested coincides with the nominal or standard profile on the screen. During operation the wedge causes displacement or movement of the bearing block to an extent such that the axial movement or feed corresponds exactly to the pitch of the gear hob to be tested and to the particular angle of rotation. The steel band 27 is linked to the wedge 35 so that the steel band always runs perpendicular to the axis of the gear hob.

With my invention I have accomplished an improved construction of testing arrangements of the kind described above whereby gear hobs and like elements having a plurality of projections or teeth disposed along a helix on a cylindrical surface may be tested or checked more readily and completely. The arrangement is simple in design and can be manufactured at relatively small cost.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. An arrangement for testing gear hobs and the like having a plurality of projections arranged to form a helix comprising a rotatable shaft for receiving such gear hob to be tested, a support for the shaft, means including a base plate holding the support and permitting movement thereof along the axis of the shaft, adjustable means for axially moving the support in response to rotation of the shaft comprising a bar held on the support, a wedge member engaging the bar and means for moving the wedge member in response to rotational movement of the shaft, a screen, and means for projecting the teeth of the gear hob onto the screen to coincide with a master formed on the screen whereby testing of a gear hob is accomplished during a single rotation of the hob.

2. An arrangement for testing gear hobs and the like having a plurality of projections arranged to form a helix comprising a rotatable shaft for receiving such gear hob to be tested, a support for the shaft, means for holding the support and permitting movement thereof in axial direction, means for axially moving the support in response to rotation of the shaft comprising a disk secured to an end portion of the shaft, a band on the disk, adjustable means biasing the band towards the disk, a wedge member linked to one end of the band and engaging the support and the holding means, a screen, and means for projecting the teeth of the gear hob onto the screen to coincide with a master formed on the screen whereby testing of a gear hob is accomplished during a single rotation of the hob.

3. An arrangement for testing gear hobs and the like having a plurality of projections arranged to form a helix, a rotatable shaft, a bearing support for the shaft means for securing a gear hob on the shaft, a screen with a master thereon, optical means for projecting an image of the projections of the hob on the screen to coincide with the master thereon, and means for rotating the shaft and for simultaneously moving the support along the axes of the shaft at a rate equal to the pitch of the projections per complete revolution of one shaft whereby the shape of the projections as well as their relative location may be tested by the master.

JAKOB NEUFELD.